(12) United States Patent
Bunker

(10) Patent No.: US 10,415,408 B2
(45) Date of Patent: Sep. 17, 2019

(54) THERMAL STRESS RELIEF OF A COMPONENT

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 15/042,674

(22) Filed: Feb. 12, 2016

(65) Prior Publication Data

US 2017/0234150 A1    Aug. 17, 2017

(51) Int. Cl.
| | | |
|---|---|---|
| *F01D 9/06* | (2006.01) | |
| *F01D 5/18* | (2006.01) | |
| *F01D 25/24* | (2006.01) | |

(52) U.S. Cl.
CPC ............... *F01D 9/065* (2013.01); *F01D 5/18* (2013.01); *F01D 25/24* (2013.01); *F05D 2220/32* (2013.01); *F05D 2230/30* (2013.01); *F05D 2260/201* (2013.01); *F05D 2260/941* (2013.01); *Y02T 50/673* (2013.01); *Y02T 50/676* (2013.01)

(58) Field of Classification Search
CPC . F01D 5/147; F01D 5/18; F01D 5/187; F01D 9/02; F01D 5/186; F01D 9/065
See application file for complete search history.

(56) References Cited

U.S. PATENT DOCUMENTS

| | | | |
|---|---|---|---|
| 5,702,232 A | 12/1997 | Moore | |
| 6,981,840 B2* | 1/2006 | Lee | F01D 5/187 415/115 |
| 7,160,084 B2* | 1/2007 | Ahmad | F01D 5/143 416/231 B |
| 7,527,474 B1 | 5/2009 | Liang | |
| 8,147,196 B2* | 4/2012 | Campbell | F01D 5/187 415/115 |
| 9,121,286 B2 | 9/2015 | Dolansky et al. | |
| 2011/0236221 A1 | 9/2011 | Campbell | |
| 2012/0269648 A1 | 10/2012 | Lee | |
| 2013/0280091 A1 | 10/2013 | Propheter-Hinckley et al. | |

(Continued)

FOREIGN PATENT DOCUMENTS

WO    WO2014052323 A1    4/2014

OTHER PUBLICATIONS

Extended European Search Report and Opinion issued in connection with corresponding EP Application No. 17155626.9 dated Jul. 19, 2017.

*Primary Examiner* — Matthew W Jellett
(74) *Attorney, Agent, or Firm* — Dority & Manning, P.A.

(57) ABSTRACT

A component for a gas turbine engine includes a hot side wall, a plurality of connection walls, and a cold side wall. The hot side wall is exposed to a core air flowpath defined by the gas turbine engine. The cold side wall is spaced from the hot side wall and rigidly connected to the hot side wall through the plurality of connection walls. The hot side wall, connection walls, and cold side wall together define a cooling air cavity. The cold side wall defines a thermal stress relief slot for at least partially accommodating a relative thermal expansion between the hot side wall and the cold side wall to reduce an amount of thermal stress within the component during operation of the component.

18 Claims, 8 Drawing Sheets

(56) References Cited

U.S. PATENT DOCUMENTS

| | | |
|---|---|---|
| 2014/0079540 A1 | 3/2014 | Morris et al. |
| 2014/0126995 A1* | 5/2014 | Schick ............... F01D 5/18 |
| | | 415/116 |
| 2014/0216042 A1 | 8/2014 | Hanson |
| 2014/0276828 A1 | 9/2014 | Howling et al. |
| 2016/0265364 A1* | 9/2016 | Ahmad ............... F01D 5/143 |

\* cited by examiner

THERMAL STRESS RELIEF OF A COMPONENT

FIELD OF THE INVENTION

The present subject matter relates generally to a double-walled component for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The turbine section typically includes a plurality of sequentially arranged stage(s) of turbine nozzles and turbine rotor blades. In at least certain gas turbine engines, the turbine nozzles and/or turbine rotor blades may be configured as a double-walled airfoil. More particularly, the airfoil may include a first wall exposed to the hot temperatures within a hot gas path of the gas turbine engine, and a second, interior wall spaced apart from the first wall. The second wall is typically rigidly connected to the first wall through one or more connection members.

During operation, however, a temperature of the first wall may become substantially higher than a temperature of the second wall. Given the temperature differential of the first and second walls, and the rigid connection between the first and second walls, and undesirable amount of thermal stress may be generated within the airfoil. Accordingly, an airfoil or other double-walled component capable of better accommodating a temperature differential between a pair of walls would be useful. Further, an airfoil or other double-walled component capable of accommodating a relative thermal expansion between a pair of walls to minimize an amount of thermal stress generated within the component would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a component for a turbomachine is provided. The turbomachine defines in part a core air flowpath. The component includes a hot side wall exposed to the core air flowpath, and a plurality of connection walls. The component additionally includes a cold side wall spaced from the hot side wall and rigidly connected to the hot side wall through the plurality of connection walls. The hot side wall, connection walls, and cold side wall together define a cooling air cavity. The cold side wall defines a thermal stress relief slot for at least partially accommodating a relative thermal expansion between the hot side wall and the cold side wall.

In an exemplary aspect of the present disclosure, a method for manufacturing a component for a gas turbine engine is provided. The gas turbine engine defines in part a core air flowpath. The method includes forming a hot side wall to be exposed to the core air flowpath, and forming a plurality of connection walls. The plurality of connection walls are rigidly connected to or formed integrally with the hot side wall. The method also includes forming a cold side wall using an additive manufacturing process. The cold side wall is rigidly connected to or formed integrally with the connection walls. The cold side wall is spaced from the hot side wall and defines a cooling air cavity together with the connection walls and hot side wall. The cold side wall is formed to define a thermal stress relief slot for at least partially accommodating a relative thermal expansion between the hot side wall and the cold side wall.

In another exemplary embodiment of the present disclosure, a turbomachine is provided. The turbomachine includes a turbine section defining in part a core air flowpath. The turbomachine also includes a component. The component includes a hot side wall exposed to the core air flowpath, and a plurality of connection walls. The component additionally includes a cold side wall spaced from the hot side wall and rigidly connected to the hot side wall through the plurality of connection walls. The hot side wall, connection walls, and cold side wall together define a cooling air cavity. The cold side wall defines a thermal stress relief slot for at least partially accommodating a relative thermal expansion between the hot side wall and the cold side wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
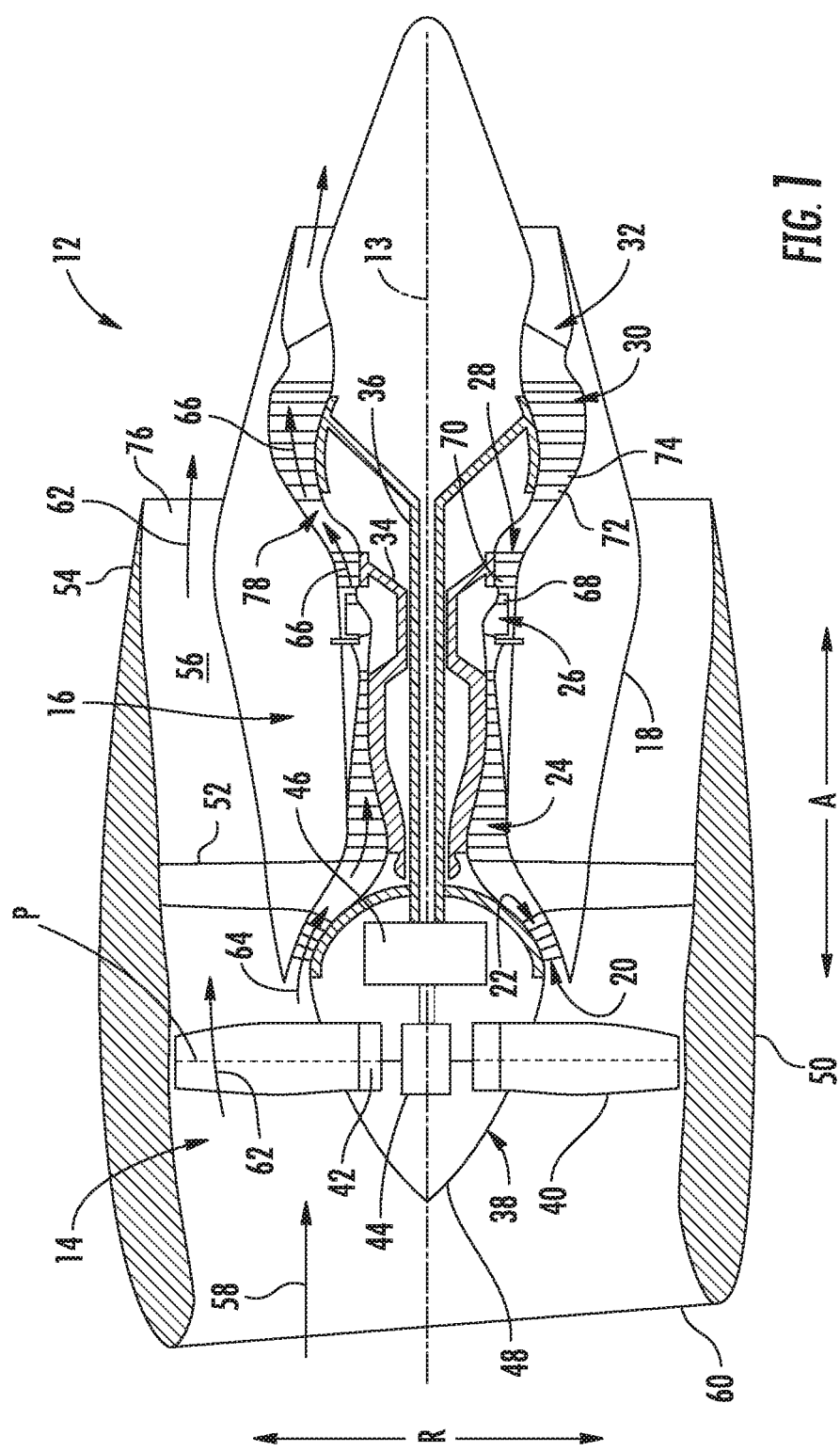
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction (not shown) extending about the axial direction A. In general, the turbofan 12 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 12 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 12, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
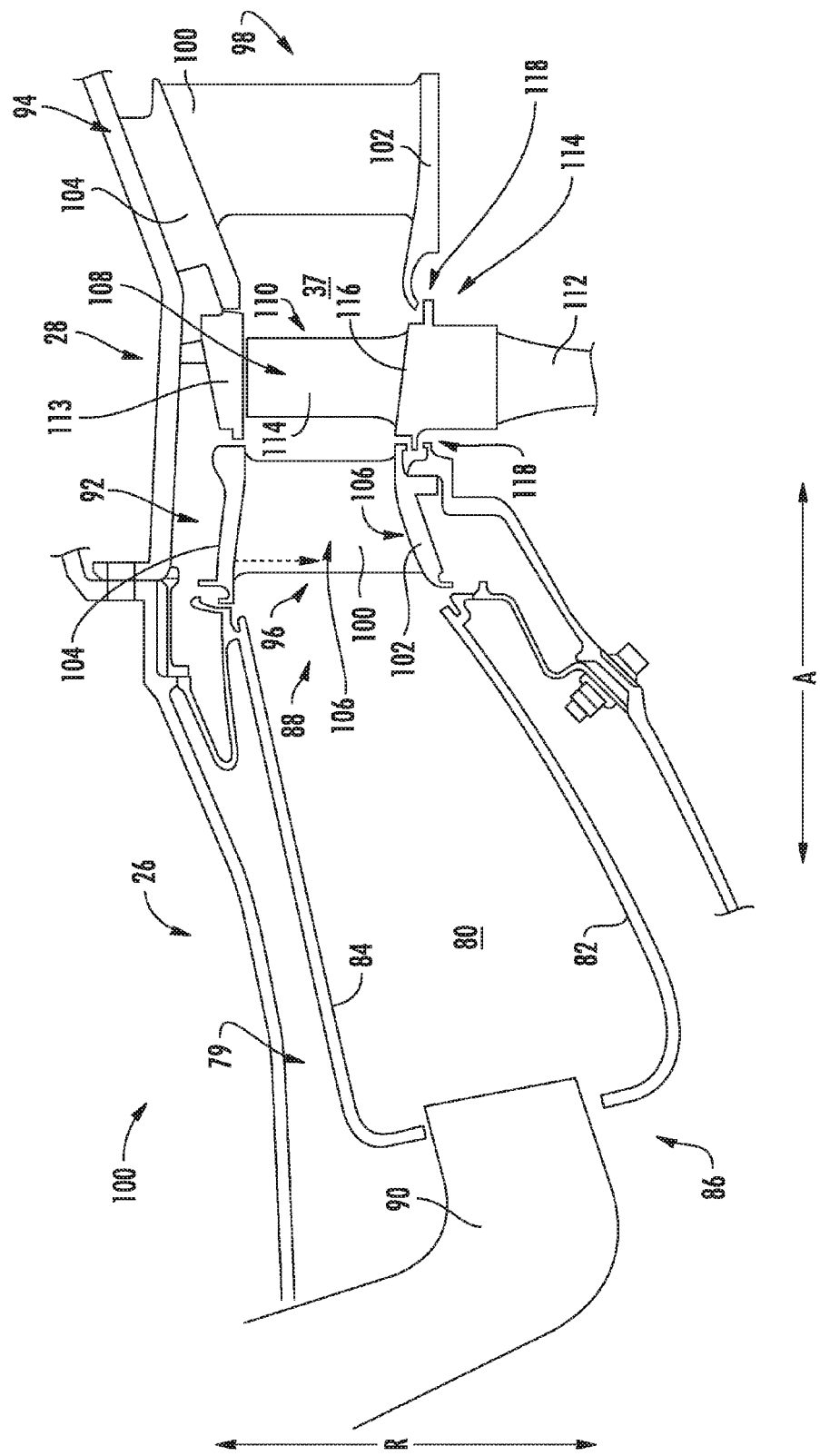
FIG. 2 is a close-up, side view of a combustion section and a turbine section of the exemplary gas turbine engine of FIG. 1.

Referring now to FIG. 2, a close-up, cross-sectional view is provided of the turbofan engine 12 of FIG. 1, and particularly of the combustion section 26 and the HP turbine 28 of the turbine section. The combustion section 26 depicted generally includes a combustor 79 having a combustion chamber 80 defined by an inner liner 82 and an outer liner 84, the combustion chamber 80 extending generally along the axial direction A from a forward end 86 to an aft end 88. A plurality of fuel nozzles 90 are positioned at the forward end 86 of the combustion chamber 80 for providing the combustion chamber 80 with a mixture of fuel and compressed air from the compressor section. As discussed above, the fuel and air mixture is combusted within the combustion chamber 80 to generate a flow of combustion gasses therethrough.

Downstream of the combustion section 26, the HP turbine 28 includes a plurality of turbine component stages, each turbine component stage comprising a plurality of turbine component sections. More particularly, for the embodiment depicted, the HP turbine 28 includes a plurality of turbine nozzle stages, as well as one or more stages of turbine rotor blades. Specifically, for the embodiment depicted, the HP turbine 28 includes a first turbine nozzle stage 92 and a second turbine nozzle stage 94, each configured to direct a flow of combustion gasses therethrough. The first turbine nozzle stage 92 includes a plurality of turbine nozzle sections 96 spaced along a circumferential direction C (a direction extending about the axial direction A; see FIG. 3). Notably, the first turbine nozzle stage 92 is located immediately downstream from the combustion section 26, and thus may also be referred to as a combustor discharge nozzle stage having a plurality of combustion discharge nozzle sections. Additionally, for the exemplary embodiment depicted, the second turbine nozzle stage 94 also includes a plurality of turbine nozzle sections 98 spaced along the circumferential direction C.

Each of the turbine nozzle sections 96, 98 forming the first and second turbine nozzle stages 92, 94 includes a turbine nozzle 100 positioned within the core air flowpath 37, exposed to and at least partially defining the core air flowpath 37. The turbine nozzle 100 is configured as an airfoil. The turbine nozzle sections 96, 98, also include an endwall, or more particularly, an inner endwall 102 and an outer endwall 104. The nozzle 100 extends generally along the radial direction R from the inner endwall 102 to the outer endwall 104. The turbine nozzle 100, inner endwall 102, and outer endwall 104 each include a flowpath surface 106 at least partially exposed to the core air flowpath 37.

Located immediately downstream of the first turbine nozzle stage 92 and immediately upstream of the second turbine nozzle stage 94, the HP turbine 28 includes a first turbine rotor blade stage 108. The first turbine rotor blade stage 108 includes a plurality of turbine rotor blade sections 110 spaced along the circumferential direction C and a first stage rotor disk 112. The plurality of turbine rotor blade sections 110 are attached to the first stage rotor disk 112, and although not depicted, the turbine rotor disk 112 is, in turn, connected to the HP shaft 34 (see FIG. 1). The turbofan engine 12 additionally includes a shroud 113 exposed to and at least partially defining the core air flowpath 37. The shroud 113 is configured to form a seal with the first turbine rotor blade stage 108.

Figure 3:
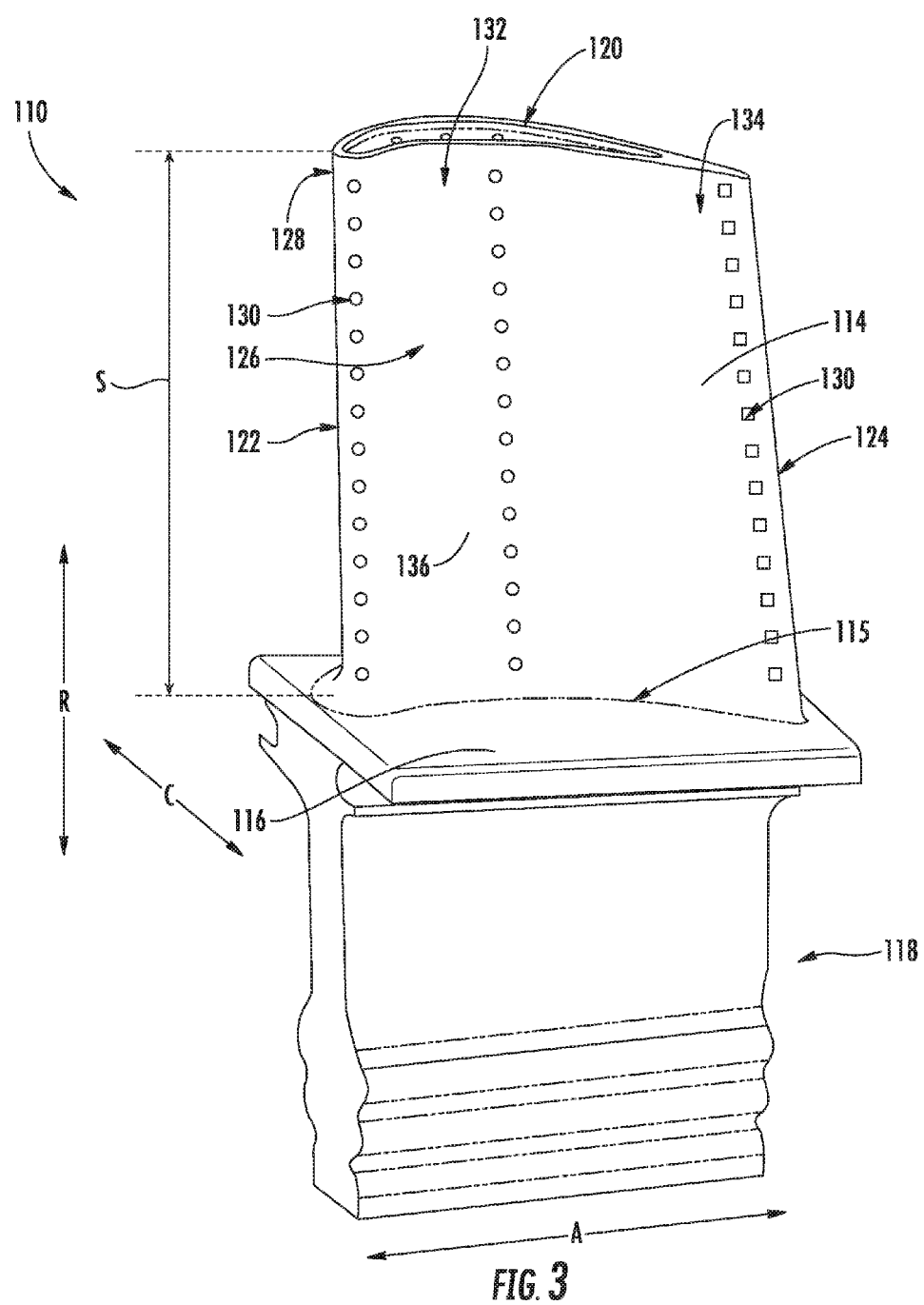
FIG. 3 is a perspective view of a rotor blade section in accordance with an exemplary embodiment of the present disclosure, the exemplary rotor blade section being configured for a rotor blade stage of the exemplary gas turbine engine of FIG. 1.

Referring now also to FIG. 3, providing a perspective view of one of the plurality of turbine rotor blade sections 110, each of the plurality of turbine rotor blade sections 110 includes a turbine rotor blade 114, a wall or platform 116, and a base 118. The rotor blade 114 is also configured as an airfoil, and extends outwardly along a spanwise direction (or rather, along the radial direction R when installed) to define a spanwise height S. Specifically, the rotor blade 114 extends along the radial direction R from a radially inner end 115 at the platform 116 to a tip 120 of the rotor blade 114. As will be appreciated, the tip 120 of the rotor blade 114 is configured to form a seal with the shroud 113 (see FIG. 2).

Additionally, the turbine rotor blade 114 defines a leading edge 122 and an opposite trailing edge 124, as well as a pressure side 126 and an opposite suction side 128. During operation, hot combustion gases are generated in the combustion section and flow in a downstream direction D (see FIG. 2) over the turbine rotor blades 114, the turbine rotor blades 114 extracting energy therefrom for rotating the rotor disk 112 supporting the rotor blades 114, which may in turn rotate the HP shaft 34.

As is also depicted, the turbine rotor blade 114 additionally includes one or more thermal management features, or more particular, includes a plurality of cooling holes 130. For the exemplary rotor blade 114 depicted, the rotor blade 114 defines a plurality of cooling holes 130 extending along the spanwise height S of the rotor blade 114 at the leading edge 122, a plurality of cooling holes 130 extending along the spanwise height S of the rotor blade 114 at the trailing edge 122, and a plurality of other cooling holes 130 extending along the spanwise height S on the pressure side 126. Although not depicted, the rotor blade 114 may also include a plurality of cooling holes 130 extending along the spanwise height S of the rotor blade 114 on the suction side 128.

Figure 4:
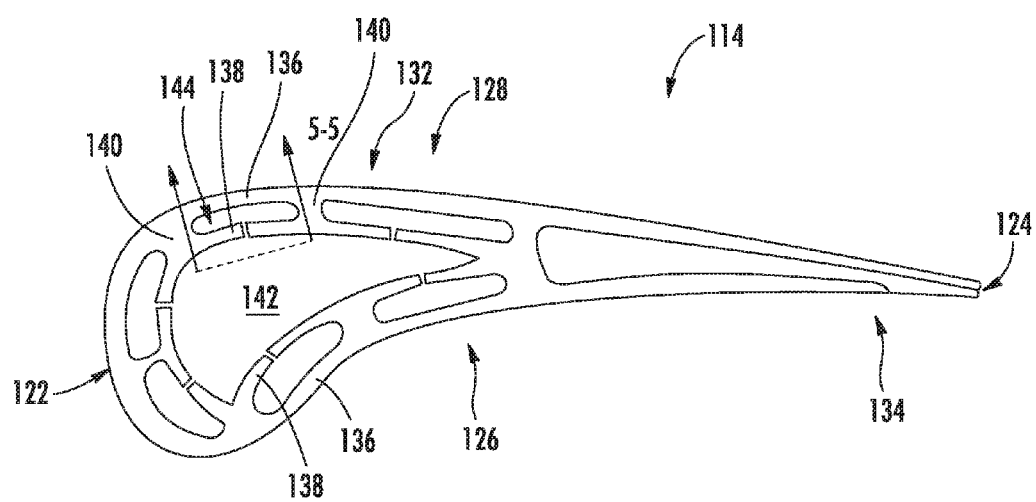
FIG. 4 is a top, cross-sectional view of the exemplary rotor blade section of FIG. 3.

Referring now also to FIG. 4, providing a cross-sectional view of the exemplary turbine rotor blade 114 of FIG. 3, the turbine rotor blade 114 is configured as a double-walled airfoil. More particularly, the turbine rotor blade 114 generally includes a body section 132 and a trailing edge section 134. The body section 132 of the turbine rotor blade 114 is formed of two substantially parallel walls. For example, the exemplary turbine rotor blade 114 depicted includes a hot side wall 136 exposed to the core air flowpath and a cold side wall 138 spaced from the hot side wall 136 and positioned within the turbine rotor blade 114. The rotor blade 114 additionally includes a plurality of connection walls 140, with the cold side wall 138 rigidly connected to the hot side wall 136 through the plurality of connection walls 140.

As is also depicted, the exemplary turbine rotor blade 114 defines a core cavity 142 and a plurality of cooling air cavities 144. The hot side wall 136, connection walls 140, and cold side wall 138 together define the plurality of cooling air cavities 144.

Figure 5:
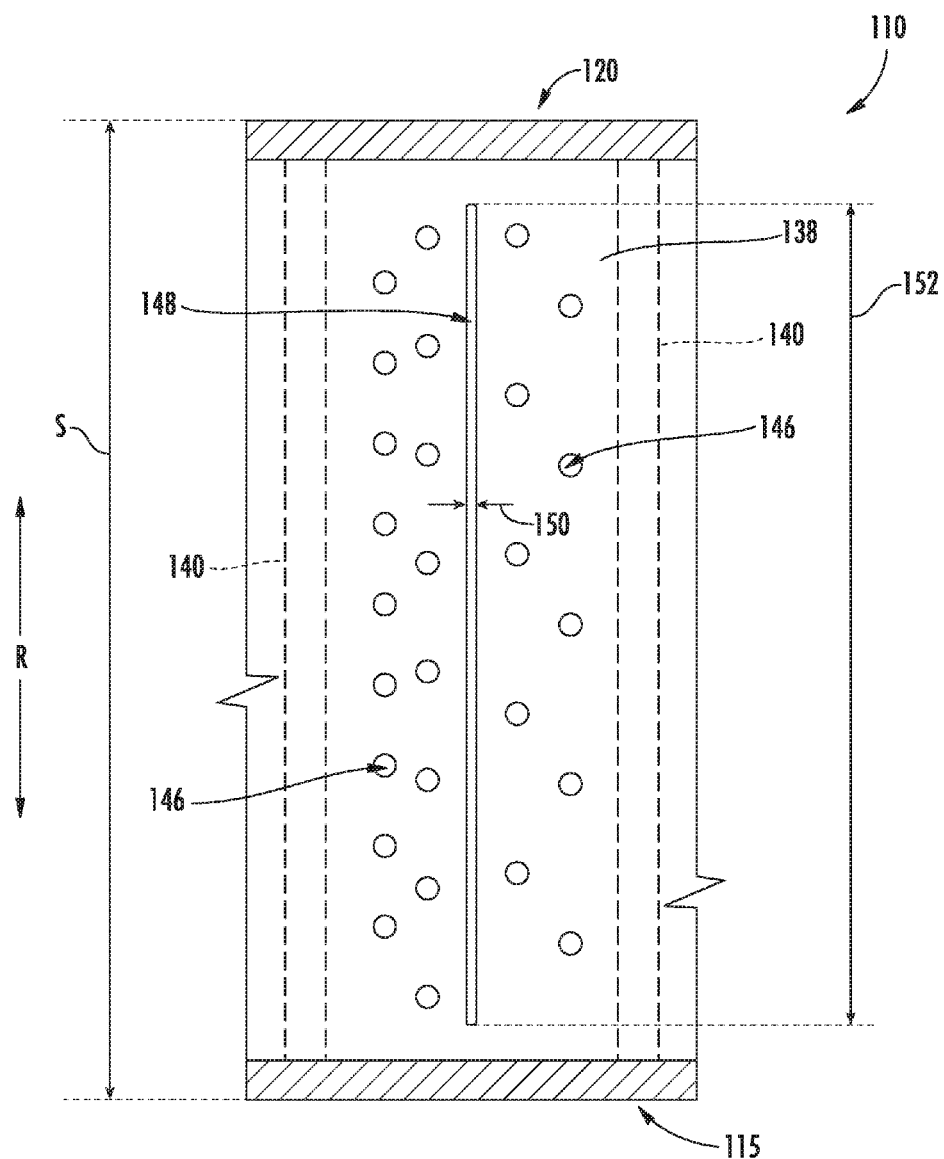
FIG. 5 is a plane view of a cold side wall of the rotor blade section of FIG. 3, from an interior portion of the exemplary rotor blade section.

Referring now to FIG. 5, an inside view of a section of the rotor blade 114 of FIG. 4 is provided, taken along Line 5-5 of FIG. 4. More particularly, FIG. 5 provides a plane view of the cold side wall 138 from the core cavity 142 of the turbine rotor blade 114, from the radially inner end 115 where the rotor blade 114 is attached to the platform 116 to the tip 120 of the rotor blade 114.

As is depicted, the exemplary cold side wall 138 depicted additionally includes a plurality of impingement holes 146 to allow a cooling airflow from the core cavity 142 into the cooling air cavity 144. Although not depicted, in certain embodiments, the cooling airflow may be provided to the cooling air cavities 144 additionally, or alternatively, from around an end of the cold side wall 138, such as through a root or from a tip of the cold side wall 138. Accordingly, in certain embodiments, the cold side wall 138 may not include the impingement holes 146. Regardless, during operation of the turbofan engine 12, a cooling airflow may be provided through, e.g., the base 118 of the rotor blade section 110 (see FIG. 3), to the core cavity 142, and from the core cavity 142 to one or more of the cooling air cavities 144. As discussed above, the hot side wall 136 additionally defines the plurality of cooling holes 130. The plurality of cooling holes 130 defined by the hot side wall 136 may be configured for allowing the cooling airflow from the cooling air cavity 144 to flow through the hot side wall 136 to provide a cooling film along an exterior surface of the rotor blade 114.

As will be appreciated, during operation of the turbofan engine 12, the hot side wall 136 will be exposed to the relatively high temperatures within the core air flowpath. By contrast, the cold side wall 138 will be exposed on one side to the core cavity 142 and on the other side to the cooling air cavity 144. Accordingly, during operation a temperature of the cold side wall 138 may be substantially less than a temperature of the hot side wall 136. Moreover, the inventor of the present disclosure has discovered that as the cold side wall 138 is rigidly connected to the hot side wall 136 through the various connection walls 140, a temperature differential between the cold side wall 138 and hot side wall 136 may cause an undesirable amount of thermal stress in one or both of the hot side wall 136 or the cold side wall 138. In order to relieve at least some of such thermal stress, the cold side wall 138 defines a thermal stress relief slot 148. Inclusion of the stress relief slot 148 allows the cold side wall 138 to at least partially accommodate relative thermal expansion between the hot side wall 136 and cold side wall 138 with less thermal stress in the components.

For the embodiment of FIG. 5, the hot side wall 136 extends along the entire spanwise height S of the rotor blade 114 and the cold side wall 138 extends at least substantially along the entire spanwise height S of the rotor blade 114. For example, the hot side wall 136 extends from the radially inner end 115 of the rotor blade 114 to the tip 120 of the rotor blade 114, and the cold side wall 138 extends from the radially inner end 115 of the rotor blade 114 substantially to the tip 120 of the rotor blade 114. It should be appreciated, however, that in other embodiments, the cold side wall 138 (and cooling air cavity 144) may not extend entirely from the radially inner end 115 to the tip 120 of the rotor blade 114.

For the embodiment depicted, the thermal stress relief slot 148 defined by the cold side wall 138 also extends in a direction parallel to the spanwise height S of the rotor blade 114 (i.e., along the spanwise direction/radial direction R). Additionally, for the embodiment depicted the thermal stress relief slot 148 extends continuously and substantially along an entirety of the spanwise height S of the rotor blade 114. More particularly, for the embodiment depicted, the thermal stress relief slot 148 defines a length 152, the length 152 being substantially equal to the spanwise height S of the rotor blade 114. It should be appreciated, that as used herein, terms of approximation, such as "about" or "substantially," refers to being within a 10% margin of error.

Furthermore, as is also depicted in FIG. 5, each of the connection walls 140 also extend in a direction parallel to the spanwise height S of the rotor blade 114 (i.e., along the spanwise direction/radial direction R). Additionally, for the embodiment depicted, the thermal stress relief slot 148 is defined by the cold side wall 138 at a location substantially equidistant between two adjacent connection walls 140.

As previously discussed, the cold side wall 138 additionally defines a plurality of impingement holes 146 for providing an airflow communication between the core cavity 142 and the cooling air cavities 144. Although the impingement holes 146 provide an opening through the cold side wall 138, the impingement holes 146 do not provide a meaningful thermal stress relief. Additionally, although the thermal stress relief slot 148 provides an opening through the cold side wall 138, the thermal stress relief slots 148 do not provide substantial airflow communication between the core cavity 142 and the cooling air cavity 144. For example, the thermal stress relief slot 148 defines a width 150 in a direction perpendicular to the direction in which it extends. In certain embodiments, the width 150 of the thermal stress relief slot 148 may be less than about one (1) millimeters ("mm"). Preferably, however, the width 150 of the thermal stress relief slot 148 may be less than about one-half (0.5) mm, less than about one-fourth (0.25) mm, or less than about one-tenth (0.1) mm. For example, in certain exemplary embodiments, the width 150 of the stress release slot 148 may be less than or equal to about 0.025 mm.

Notably, for the embodiment depicted, the thermal stress relief slot 148 defines a substantially constant width 150 along the entire length 152 of the slot 148. However, in other embodiments, the cold side wall 138 may instead define a variable width 150 stress release slot 148 based on an anticipated amount of expansion/thermal stress of the components.

It should also be appreciated, that in other exemplary embodiments, the cold side wall 138 may define any other suitable thermal stress relief slot(s) 148. For example, referring now to FIG. 6, an inside view/plane view is provided of a cold side wall 138 from a core cavity 142 of a turbine rotor blade 114 in accordance with another exemplary embodiment of the present disclosure. The turbine rotor blade 114 depicted in FIG. 6 may be configured in substantially the same manner as exemplary turbine rotor blade 114 described above with reference to FIG. 5. Accordingly, the same or similar numbering may refer to same or similar part.

Figure 6:
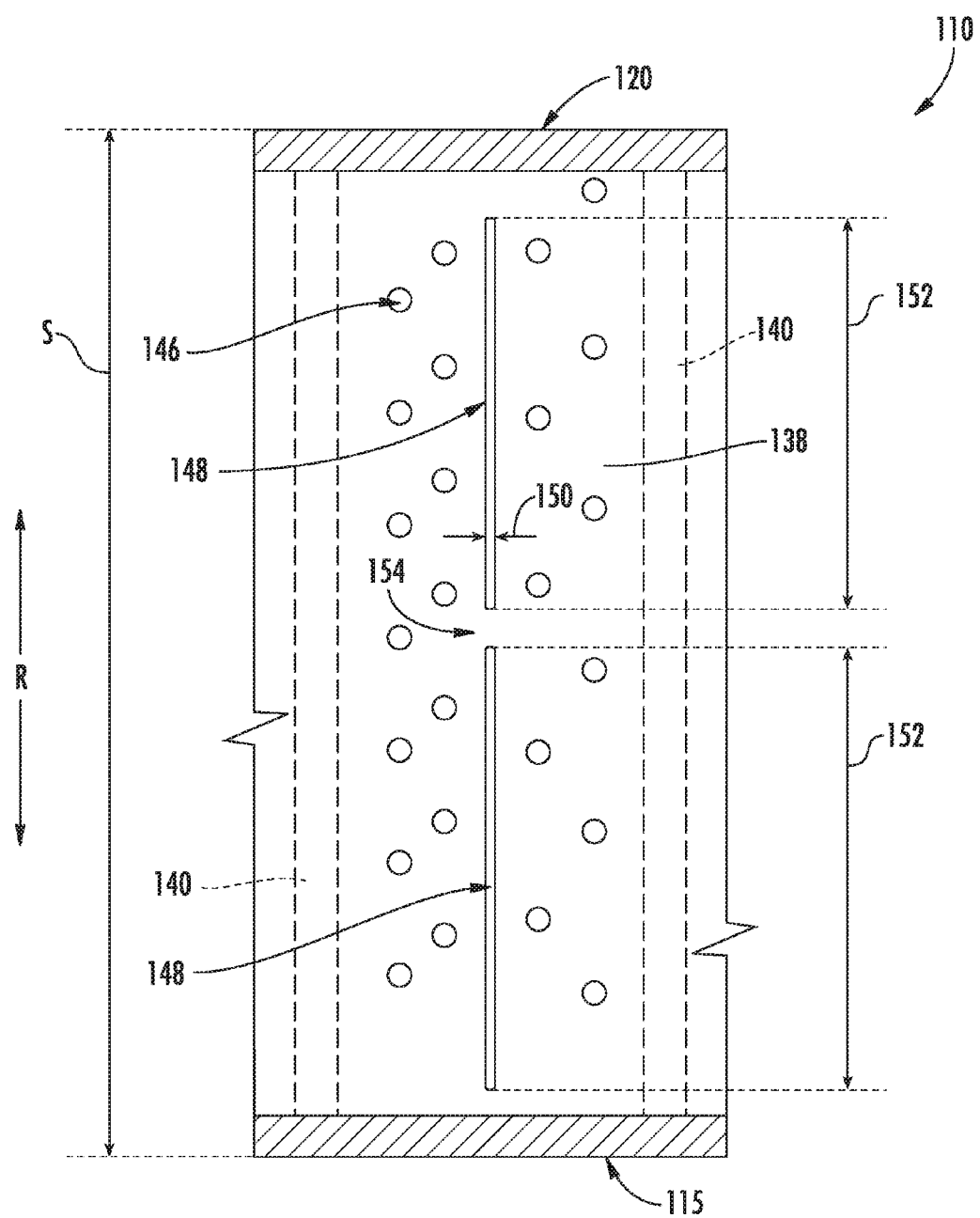
FIG. 6 is a plane view of a cold side wall of a rotor blade section in accordance with another exemplary embodiment of the present disclosure, from an interior portion of the exemplary rotor blade section.

However, for the embodiment of FIG. 6, the cold side wall 138 further defines a plurality of thermal stress relief slots 148. Each of the plurality of thermal stress relief slots are aligned and extend in a direction parallel to a spanwise height S of the rotor blade 114. Further, the plurality thermal stress relief slots 148 together extend substantially along the entire spanwise height S of the rotor blade 114. More particularly, each of the thermal stress relief slots 148 define a length 152, and the sum of the lengths 152 of the aligned thermal stress relief slots 148 is substantially equal to the spanwise height S of the rotor blade 114. Accordingly, although there are breaks 154 between adjacent stress relief slots 148, the plurality thermal stress relief slots 148 may still provide a desired amount of thermal stress relief during operation of the turbofan engine 12. Despite there being a plurality of stress relief slots 148, the stress release slots 148 depicted may in other respects be configured in the same manner as exemplary stress release slots 148 defined by the cold side wall 138 described above.

Further, in still other exemplary embodiments the present disclosure, the cold side wall 138 may define any other suitable form of stress relief slots 148. For example, referring now to FIG. 7, an inside view/plane view is provided of a cold side wall 138 from a core cavity 142 of a turbine rotor blade 114 in accordance with still another exemplary embodiment of the present disclosure. The turbine rotor blade 114 depicted in FIG. 7 may also be configured in substantially the same manner as exemplary turbine rotor blade 114 described above with reference to FIG. 5. Accordingly, the same or similar numbering may also refer to the same or similar part.

Figure 7:
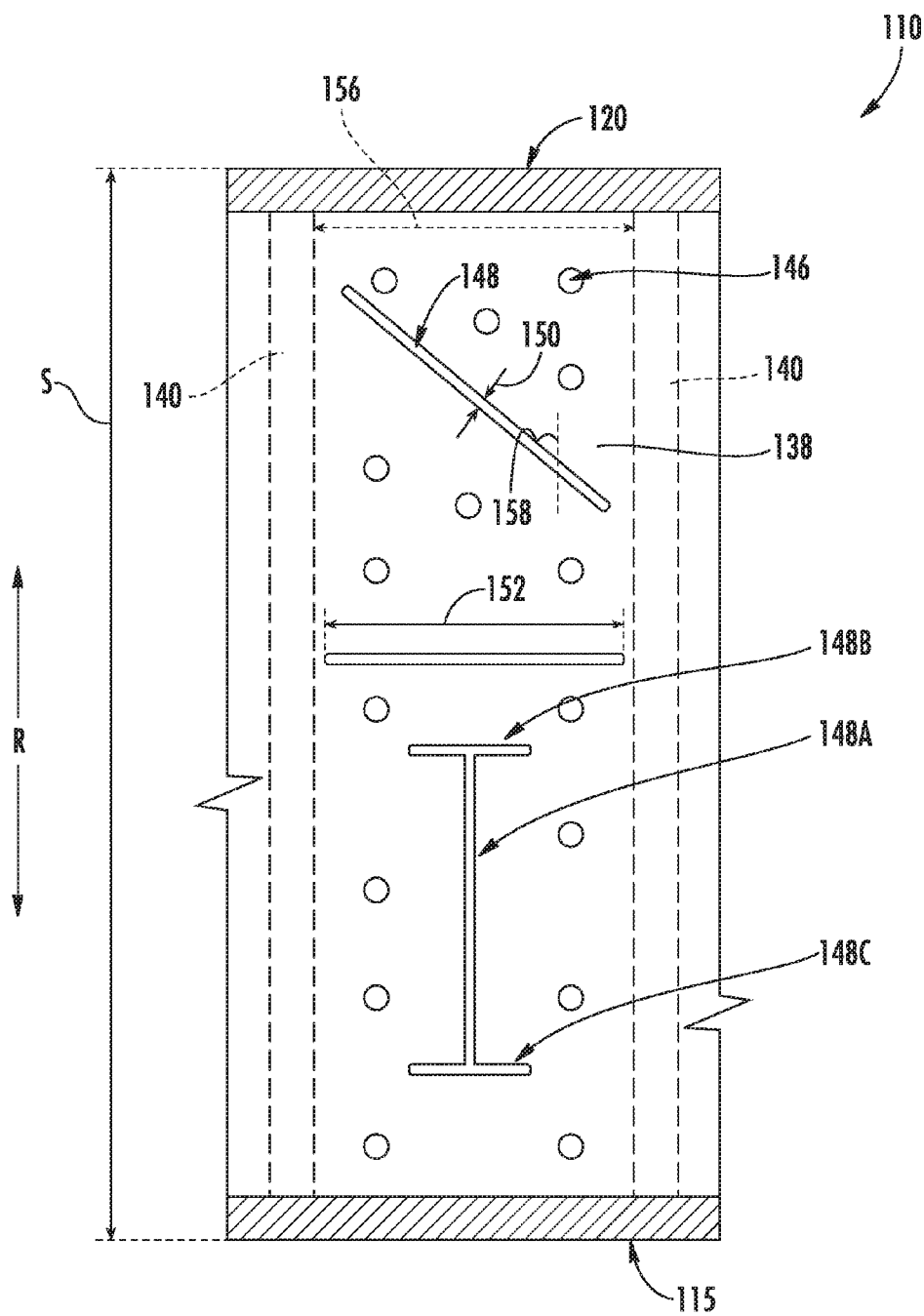
FIG. 7 is a plane view of a cold side wall of a rotor blade section in accordance with yet another exemplary embodiment of the present disclosure from an interior portion of the exemplary rotor blade section.

For the embodiment of FIG. 7, the cold side wall 138 also defines a plurality of thermal stress relief slots 148. However, one or more of the stress relief slots 148 defined by the exemplary cold side wall 138 of FIG. 7 do not extend in a direction parallel to the spanwise height S of the rotor blade 114 (i.e. the radial direction R), and instead extend in a direction perpendicular to the spanwise height S of the rotor blade 114. For the embodiment depicted, the thermal stress relief slots 148 extending in a direction perpendicular to the spanwise height S of the rotor blade 114 extend substantially between adjacent connection walls 140 (depicted in phantom). More particularly, for the embodiment depicted, the adjacent connection walls 140 define a separation distance 156 therebetween, and a length 152 of the thermal stress relief slot 148 extending in a direction perpendicular to the spanwise height S of the rotor blade 114 is substantially equal to the separation distance 156.

Notably, the exemplary embodiment of FIG. 7 additionally includes one or more slanted thermal stress relief slots 148 defining an angle 158 with the direction parallel to the spanwise height S of the rotor blade 114 (i.e., the radial direction R). The angle 158 is greater than zero degrees (0°) and less than ninety degrees (90°). Particularly, for the embodiment depicted, the slanted thermal stress relief slots 148 define an angle 158 with the direction parallel to the spanwise height S of the rotor blade 114 (i.e., the radial direction R) of about forty-five degrees (45°). Notably, these slanted thermal stress relief slots 148 defined by the cold side wall 138 also extend substantially between adjacent connection walls 140 (depicted in phantom).

Moreover, the exemplary embodiment of FIG. 7 additionally includes one or more thermal stress relief slots 148 having stress relief slots 148 defined integrally at one or both terminating ends. Specifically, the embodiment of FIG. 7 includes a first stress relief slot 148A extending in a direction parallel to the spanwise height S, with a second stress relief slot 148B defined integrally at a first terminal end and a third stress relief slot 148C defined integrally at a second terminal end. The slots 148B, 148C at the terminal ends may be orthogonal to the first stress relief slot 148A. Such a configuration may minimize a risk of the slots 148 generating and propagating cracks in the cold side wall 138.

A component for a gas turbine engine including a cold side wall defining a thermal stress relief slot in accordance with one or more embodiments of the present disclosure may allow for a component to include less thermal stress during operation of the gas turbine engine. More particularly, a component for a gas turbine engine including a cold side wall defining a thermal stress relief slot in accordance with one or more embodiments of the present disclosure may allow for the component to include the double walled configuration as is desirable in certain components, without necessarily including increased thermal stress within the component due to the inevitable temperature differentials between the cold side wall and a hot side sidewall.

It should be appreciated, however, that the various exemplary thermal stress relief slots 148 defined by the cold side walls 138 described above with reference to FIGS. 4 through 7 are provided by way of example only. In other exemplary embodiments, the thermal stress relief slots 148 defined by the cold side wall 138 may have any other suitable shape, size, or configuration for providing a thermal stress relief for the component. For example, in other embodiments, the thermal stress relief slots 148 may define a zig-zag shape, a curved shape, or any other suitable shape. Additionally, or alternatively, the slots 148 may define an angle through a thickness (i.e., in a direction from the core air cavity 142 to the cooling air cavity 144, as shown in FIG. 4).

Further, in light of the above benefits, it should be appreciated that in still other embodiments, the component including a cold side wall 138 configured in accordance with one or more embodiments described herein may instead be any other component for a gas turbine engine having a double-walled configuration. For example, in other exemplary embodiments, the component may be a nozzle section of a nozzle stage in a turbine section of the gas turbine engine. For example, the component may be a nozzle of the nozzle section and/or an end wall of the nozzle section (e.g., nozzle 100, and endwalls 102, 104). Additionally, or alternatively, the component may be a shroud for the gas turbine engine (e.g., shroud 113), or may be a component of the combustor.

Furthermore, as is discussed in greater detail below with reference to the exemplary flow diagram of FIG. 8, the cold side wall 138 of the component may be formed using an additive manufacturing process (also known as rapid prototyping, rapid manufacturing, and 3D printing). For example, in certain exemplary aspects, the cold side wall 138 of the component (defining the thermal stress relief slot 148) may be formed using selective laser sintering (SLS), direct metal laser sintering (DMLS), electron beam melting (EBM), diffusion bonding, or selective heat sintering (SHS). Additionally, in certain embodiments, the connection walls 140 may also be formed integrally with the cold side wall 138 using an additive manufacturing process. Further, in still other embodiments, the hot side wall 136 may also be formed integrally with the connection walls 140 and cold side wall 138 using an additive manufacturing process. A component formed in accordance with one or more these embodiments may allow for the cold side wall 138 to define the relatively fine details described herein.

Figure 8:
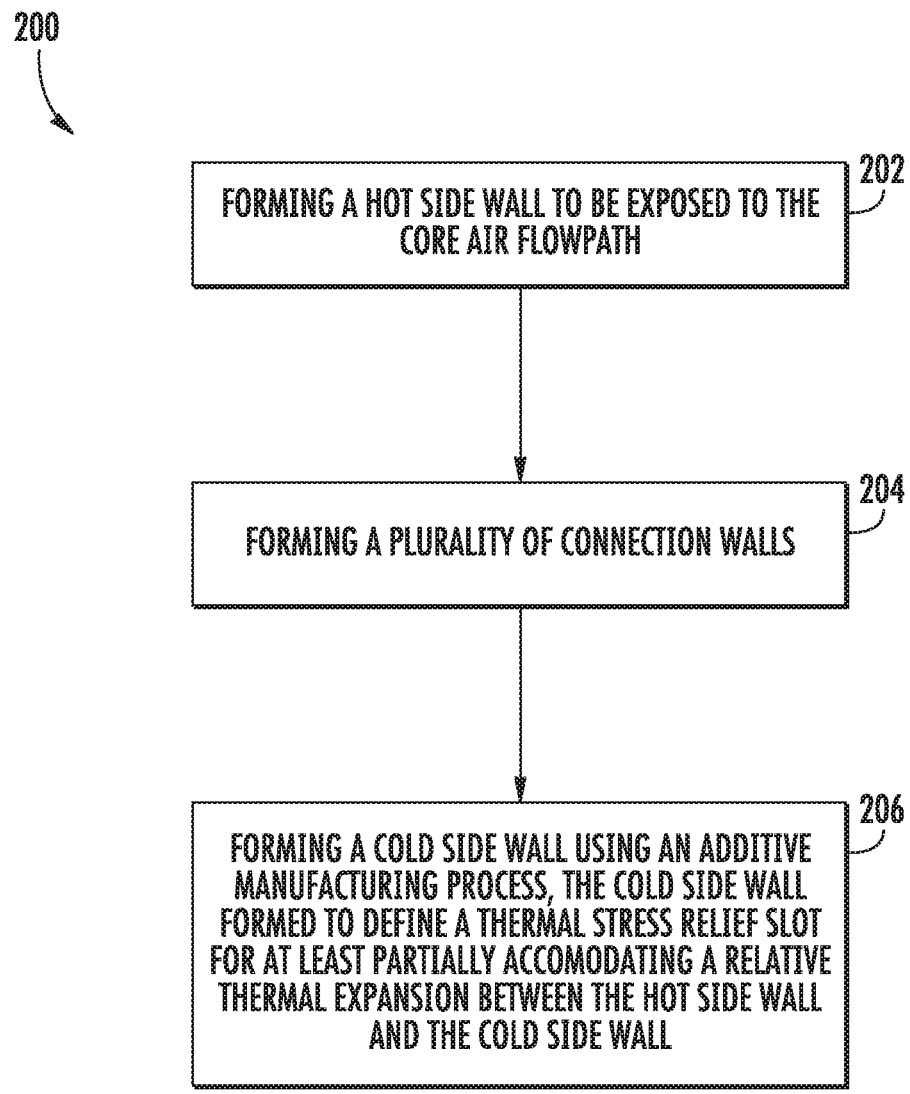
FIG. 8 is a flow diagram of a method for manufacturing a component for a gas turbine engine.

Referring now to FIG. 8, a flow diagram of a method for manufacturing a component for a gas turbine engine is provided. The gas turbine engine may be configured in substantially the same manner as the exemplary turbofan engine 12 described above with reference to FIG. 1. Accordingly, the exemplary gas turbine engine may define in part a core air flowpath.

As depicted, the exemplary method (200) includes at (202) forming a hot side wall to be exposed to the core air flowpath. Additionally, the exemplary method (200) includes at (204) forming a plurality of connection walls. The plurality of connection walls formed at (204) are rigidly connected to or are formed integrally with the hot side wall formed at (202). Further, the exemplary method (200) of FIG. 8 includes at (206) forming a cold side wall using an additive manufacturing process. The cold side wall formed at (206) is rigidly connected to or is formed integrally with the connection walls formed at (204). The cold side wall is spaced from the hot side wall and defines a cooling air cavity together with the connection walls and the hot side wall. The cold side wall is formed at (206) to define a thermal stress relief slot for at least partially accommodating relative thermal expansion between the hot side wall and the cold side wall.

Notably, in certain exemplary aspects, one or more of the connection walls and hot side wall may be formed integrally with the cold side wall using an additive manufacturing process. For example, in certain exemplary aspects, forming the plurality of connection walls at (204) may include forming the plurality of connection walls integrally with the cold side wall formed at (206) using an additive manufacturing process. Additionally, in certain exemplary aspects, forming the hot side wall at (202) may further include forming the hot side wall integrally with the cold side wall and the connection walls using an additive manufacturing process. Accordingly, in such an embodiment, the entire component may be formed integrally using an additive manufacturing process.

A component for a gas turbine engine formed in accordance with one or more the exemplary aspects described herein may allow for the component to define the relatively fine details of certain of the exemplary embodiments described herein. For example, a component for a gas turbine engine formed in accordance with one or more of the exemplary aspects described herein may include a thermal stress relief slot to relieve a thermal stress within the component due to a relative temperature differential between certain aspects of the component, without substantially altering cooling airflow patterns therethrough.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a turbomachine, the turbomachine defining in part a core air flowpath, the component comprising:
    a hot side wall exposed to the core air flowpath when installed in the gas turbine engine;
    a plurality of connection walls; and
    a cold side wall spaced from the hot side wall and rigidly connected to the hot side wall through the plurality of connection walls, the hot side wall, connection walls, and cold side wall together defining a cooling air cavity, the cold side wall defining a thermal stress relief slot for at least partially accommodating a relative thermal expansion between the hot side wall and the cold side wall, wherein the cold side wall further defines a plurality of impingement holes to allow a cooling airflow into the cooling air cavity;
    wherein the component is an airfoil for the gas turbine engine, wherein the airfoil defines a spanwise direction, wherein the hot side wall and the cold side wall each extend along the spanwise direction of the airfoil, and wherein the thermal stress relief slot also extends along the spanwise direction of the airfoil, wherein the thermal stress relief slot defines a width in a direction perpendicular to the spanwise direction, and wherein the width is less than about one millimeter.

2. The component of claim 1, wherein the airfoil is for a turbine section of the gas turbine engine.

3. The component of claim 1, wherein the plurality of connection walls extend along the spanwise direction, wherein the thermal stress relief slot defined by the cold side wall are defined at a location substantially equidistant between the first and second connection walls.

4. The component of claim 1, wherein the cold side wall further defines a plurality of thermal stress relief slots, wherein the airfoil defines a spanwise height, wherein the cold side wall extends substantially along an entirety of the spanwise height, and wherein the plurality of thermal stress relief slots together extend substantially along an entirety of the spanwise height.

5. The component of claim 1, wherein the hot side wall defines a plurality of cooling holes for allowing a cooling airflow from the cooling air cavity through the hot side wall.

6. The component of claim 1, wherein the component is a nozzle section of a nozzle stage for the gas turbine engine, and wherein the hot side wall and cold side wall form an endwall of the nozzle section.

7. The component of claim 1, wherein the width is less than or equal to about 0.025 millimeters.

8. The component of claim 4, wherein the plurality of connection walls includes a first connection wall and a second connection wall, the second connection wall positioned adjacent to the first connection wall, and wherein the cold side wall further defines a plurality of thermal stress relief slots positioned between the first and second connection walls for at least partially accommodating a relative thermal expansion between the hot side wall and the cold side wall.

9. The component of claim 8, wherein the plurality of thermal stress relief slots includes a first thermal stress relief slot and a second thermal stress relief slot arranged along the spanwise direction, and wherein the cold side wall includes a break between the first and second thermal stress relief slots.

10. The component of claim 9, wherein the component defines a contiguous cooling air cavity section between the cold side wall, the hot side wall, and the first and second connection walls, and wherein the plurality of thermal stress relief slots extend along the contiguous cooling air cavity section along the spanwise direction.

11. The component of claim 1, wherein the airfoil defines a spanwise height along the spanwise direction, wherein the cold side wall extends substantially along an entirety of the spanwise height, and wherein the thermal stress relief slot also extends substantially along an entirety of the spanwise height.

12. The component of claim 1, wherein the width is less than or equal to about 0.5 millimeters.

13. A turbomachine comprising:
    a turbine section defining in part a core air flowpath; and
    a component comprising
        a hot side wall exposed to the core air flowpath;
        a plurality of connection walls; and
    a cold side wall spaced from the hot side wall and rigidly connected to the hot side wall through the plurality of connection walls, the hot side wall, connection walls, and cold side wall together defining a cooling air cavity, the cold side wall defining a thermal stress relief slot for at least partially accommodating a relative thermal expansion between the hot side wall and the cold side wall,
    wherein the component is an airfoil, wherein the airfoil defines a spanwise direction and a spanwise height along the spanwise direction, wherein the hot side wall and the cold side wall each extend along the spanwise direction of the airfoil, and wherein the thermal stress relief slot also extends along the spanwise direction of the airfoil, wherein the cold side wall and the thermal stress relief slot each extend substantially along an entirety of the spanwise height, wherein the thermal stress relief slot defines a width in a direction perpendicular to the spanwise direction, and wherein the width is less than about one millimeter.

14. The component of claim 13, wherein the width is less than or equal to about 0.5 millimeters.

15. A component for a turbomachine, the turbomachine defining in part a core air flowpath, the component comprising:
- a hot side wall exposed to the core air flowpath when installed in the gas turbine engine;
- a plurality of connection walls; and
- a cold side wall spaced from the hot side wall and rigidly connected to the hot side wall through the plurality of connection walls, the hot side wall, connection walls, and cold side wall together defining a cooling air cavity, the cold side wall defining a plurality of thermal stress relief slots for at least partially accommodating a relative thermal expansion between the hot side wall and the cold side wall;
- wherein the component is an airfoil for the gas turbine engine, wherein the airfoil defines a spanwise direction and a spanwise height, wherein the hot side wall and the cold side wall each extend along the spanwise direction of the airfoil, wherein the plurality of thermal stress relief slots also extend along the spanwise direction of the airfoil and together extend substantially along an entirety of the spanwise height, wherein the plurality of thermal stress relief slots each define a width in a direction perpendicular to the spanwise direction, wherein the width is less than about one millimeter.

16. The component of claim 15, wherein the plurality of thermal stress relief slots includes a first thermal stress relief slot and a second thermal stress relief slot arranged along the spanwise direction, and wherein the cold side wall includes a break between the first and second thermal stress relief slots.

17. The component of claim 15, wherein the component defines a contiguous cooling air cavity section between the cold side wall, the hot side wall, and the first and second connection walls, and wherein the plurality of thermal stress relief slots extend along the contiguous cooling air cavity section along the spanwise direction.

18. The component of claim 15, wherein the width is less than or equal to about 0.5 millimeters.

* * * * *